United States Patent

Yamaguchi

[11] 4,116,529
[45] Sep. 26, 1978

[54] WIDE-ANGLE SPYGLASS

[76] Inventor: Takeyoshi Yamaguchi, 20-54, Tsurumaki, 5-chome, Setagaya-ku, Tokyo, Japan, 154

[21] Appl. No.: 745,697

[22] Filed: Nov. 29, 1976

[51] Int. Cl.$^2$ .............................................. G02B 7/02
[52] U.S. Cl. ...................................... 350/69; 350/78; 350/212; 350/319
[58] Field of Search ..................... 350/69, 78, 212, 319

[56] References Cited

U.S. PATENT DOCUMENTS 3,514,188  5/1970  Blosse et al. ...................... 350/319 X

FOREIGN PATENT DOCUMENTS 1,378,602  10/1964  France ........................................ 350/69

Primary Examiner—John K. Corbin
Assistant Examiner—Matthew W. Koren
Attorney, Agent, or Firm—Burns, Doane, Swecker & Mathis

[57] ABSTRACT

An optical spyglass of a compact dimension to be mounted in a house door or the like for providing to an interior viewer a substantially 180° wide-angle outdoor view. Its optical system comprises a wide-angle lens having a convex surface of a large radius curvature and an opposing convex surface of a small radius curvature for converging incoming light of substantially 180° outdoor sight at a large rate, an objective having a concave surface and butted coaxially on the side of the concave surface of the lens for collimating the converged light to be of a small confined diameter, an eyepiece having a convex surface disposed coaxially with the objective and spaced therefrom for magnifying the collimated light to be of a normal view of the outdoor sight. Such optical system is secured in a substantially tubular barrel body disposed closely around the collimated light of the confined diameter. The barrel body of the spyglass is inserted in a through hole made in the door or the like and is secured thereto by means of a cylinder member engaged onto the barrel body holding the door or the like between opposing flanges provided on the barrel body and cylinder member.

5 Claims, 3 Drawing Figures

WIDE-ANGLE SPYGLASS

This invention relates to optical spyglasses to be set in doors, walls or the like and, more particularly, to improvements in such spyglasses providing a wide-angle view outside the door or the like.

The spyglasses have been required to provide as much wide-angle outside view as possible to render dead angle of the view to be the least whereas their dimension specifically at their barrel diameter has been restricted to be small, generally to be substantially 12 mm., and mostly due to such dimensional restriction the angle of the view has been limited to be about 160°, which could be made wider by employing a wide-angle lens but normally resulting in a larger diameter of the barrel in order to retain a clear and bright view. For the purpose of maintaining the structure of the spyglass of such smaller dimension to be simpler for easy and inexpensive manufacture, on the other hand, respective lenses have been secured to inner surface of the body barrel usually by means of an adhesive applied to peripheries of the lenses, so that assembling work of the lenses has been rather troublesome and any adhesive often apt to be applied to lens surfaces carelessly would easily render the products to be inferior or even condemned. The present invention has been suggested to remove such defects of the conventional optical spyglasses.

According to the present invention, a spyglass of a wider angled view comprises an optical system including a wide-angle lens of a relatively large diameter having a convex surface of a large radius curvature and an opposing surface centrally concaved with a small radius curvature and thus deeply or steeply into the lens, said lens being fixed flatly against a flange of a substantially cylindrical barrel body, an objective of a relatively small diameter butted against the centrally concaved surface of the lens coaxially therewith and inside the barrel body as held between the lens and the barrel body and an eyepiece fixed inside the barrel body adjacent the other end thereof and coaxially with the wide-angle lens and objective, and a telescopic cylinder member having a flange at an end for fixing the optical system to a door or the like by mounting onto outer periphery of the barrel body inserted in a hole made through the door or the like so that the respective flanges of the barrel body and cylinder member will hold the door or the like therebetween as butted against exterior and interior surfaces of the door or the like, respectively.

A primary object of the present invention is, therefore, to provide an optical spyglass presenting a wider angled view and still compact in dimensions.

Another object of the present invention is to provide a wide-angle spyglass wherein a combination of a wide-angle lens and an objective is suitably adapted to provide a wide angled view without increasing the diameter of barrel part of optical system.

A further object of the present invention is to provide a wide-angle spyglass having a structure easy to assemble and disassemble.

Another related object of the present invention is to provide a wide-angle spyglass which is compact in its substantial dimensions and is still simple in the structure for easy and accurate assembling of optical system requiring no adhesive for fixing its optical elements.

Other objects and advantages of the present invention shall be made clear upon reading the following descriptions of the invention detailed with reference to preferred embodiments thereof shown in accompanying drawings, in which.

Figure 1:
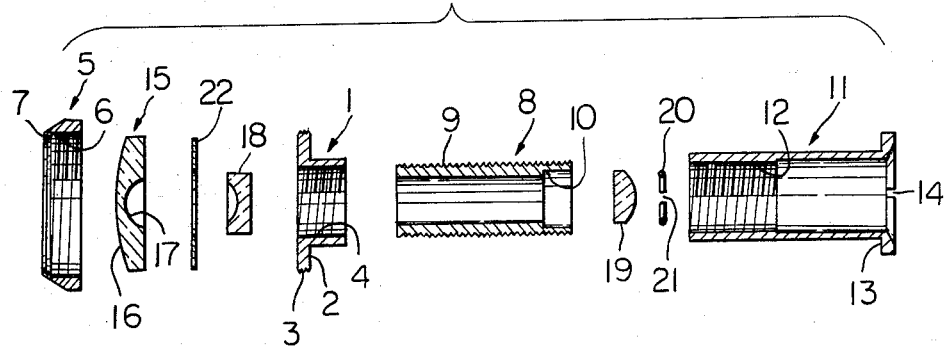
FIG. 1 is a sectioned view of respective components as disassembled of a wide-angle spyglass in an embodiment according to the present invention.

Referring to an embodiment shown in FIG. 1 of a wide-angle spyglass according to the present invention, provisions of respective components of an optical system of the spyglass are concentrated in to a a barrel member 1, which is of a substantially cylindrical shape provided at an axial end with a flange 2 having a male threaded periphery 3 and on the inner periphery with female screw threads 4, by means of a substantially ring-shaped fixture member 5 for fixing a wide-angle lens 15 and a tubular sleeve member 8 for an objective 18 and eyepiece 19 as will be detailed later. The ring-shaped fixture member 5 has a thickness larger than that of the wide-angle lens at its peripheral edge and an inner diameter sufficient for intimately enclosing the lens and is provided at its inner periphery with female screw threads 6 to be screwed onto the threaded periphery 3 of the barrel member 1 and at an end of the inner periphery with an inward flange 7 extending by a small distance for holding the wide-angle lens 15 between the flange 7 and the flange 2 of the barrel member 1 through a ring-shaped light shielding plate 22. The sleeve member 8 is provided on the outer periphery of its tubular body having an outer diameter corresponding to inner diameter of the barrel member 1 with male threads 9 to mesh with the female threads 4 of the member 1 and at an axial end of inner cylindrical hole with an enlarged bore part providing a step 10 for mounting thereon the eyepiece 19 in cooperation with a substantially C-shaped spring 20 having a slit 21. The optical system formed with the respective components described above and assembled as will be referred to later is to be mounted to a door or the like by means of a cylinder member 11 of a bore diameter corresponding to the outer diameter of the sleeve 8, and the cylinder member 11 is provided on the inner peripheral surface for at least a part of its axial length from an end to the middle with female screw threads 12 to mesh with the male threads 9 on the sleeve member 8 so that the cylinder member 11 may be screwed over the sleeve member 8. The member 11 is also provided at the other end with a flange 13 having a pair of diametrally opposing grooves 14 on the endwise surface for receiving a screwdriver tip or coin edge so as to be thereby rotated.

Referring more in detail to the optical elements of the optical system employed in the present invention, the wide-angle lens 15 has a spherical or convex surface 16 of a large radius curvature to face outdoor sight and an opposing flat surface including a spherical concave surface 17 of a much smaller radius curvature which is coaxial with the convex surface 16. Thus the concave surface 17 deeply or steeply enters into the lens 15 providing a relatively small opening in the center of the flat surface while leaving therearound a ring-shaped flat area to which the light shielding plate 22 of a black material or having at least black surfaces is butted, so that substantially 180 degree wide outdoor view entering from the convex surface 16 will be converged well enough for being collimated within a diametrally limited light path inside the barrel 1 and sleeve 8 the outer diameter of which is practically desired to be 12 mm. at most or less than that. That is, while the diameter of the lens 15 per se may be determined rather freely to be as large as possible for providing a clear wider angled view, the diameter of the concave 17 at the opening on the flat surface should be determined to correspond practically to effective bore diameter of the sleeve member 8 fitted in the barrel member 1 for providing the diametrally limited light path. The objective 18 is of an ordinary concave lens having a concave surface also of an opening diameter substantially identical to that of the concave 17 of the wide-angle lens 15 and the outer diameter of this objective 18 is determined to be slightly less than the inner diameter of the barrel member 1 so that the objective may be fitted in the member 1. The eyepiece 19 is also an ordinary convex lens dimensioned to be fitted into the enlarged bore part of the sleeve 8.

In assembling the respective components described above of the optical system of the spyglass according to the present invention, the wide-angle lens 15 is fitted in the fixture member 5 to rest on its flange 7 and then the light shielding plate 22 is placed on the flat surface side of the lens around the concave 17. Then the barrel member 1 is screwed into the fixture member 5 with the threads 3 on the periphery of the flange 2 screwed to the inner threads 6 of the fixture member until the flat surface of the flange 2 tightly abuts the light shielding plate 22 so that the lens 15 will be stationarily held between the flanges 7 and 2 of the members 5 and 1, respectively, through the light shielding plate 22. Inside the bore of the barrel member 1, the objective 18 is inserted next so that the same will be placed in the axial hole of the light shielding plate 22 facing with its concaved surface the concave 17 of the wide-angle lens 15 coaxially. The sleeve member 8 is screwed with its outer peripheral threads 9 into the inner peripheral threads 4 of the barrel 1 at an end of the sleeve opposite to the end having the enlarged bore part until the former end abuts the objective 18 on its flat surface side to stationarily hold the objective 18 in the position. The eyepiece 19 is then inserted into the enlarged bore part of the sleeve member 8 to rest on the step 10 and the C-shaped spring 20 is resiliently fitted in the enlarged bore part to abut the convex surface side of the eyepiece 19 so that the latter will be stationarily held as butted against the step 10. It will be readily appreciated in the above connection that the eyepiece 19 may be mounted into the sleeve member 8 before the sleeve is mounted to the barrel member 1.

Figure 2:
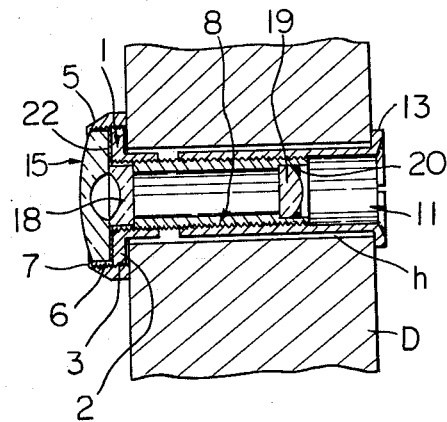
FIG. 2 is a sectional view as assembled and mounted to a door of the wide-angle spyglass shown in FIG. 1.

Thus the optical system having a substantially T-shape in section is formed with the respective components assembled as described above, exposing the peripheral threads 9 of the sleeve member 8, and the cylinder member 11 is to be fitted over the sleeve member 8 with the inner peripheral threads 12 brought into mesh with the threads 9, as shown in FIG. 2, in order to fixedly mount the optical system assembly to a door or the like.

In mounting the spyglass of the present invention to the door or the like, referring next to FIG. 2 showing a state in which the spyglass is mounted to a door D in the present instance, the optical system assembly from which the cylinder member 11 is dismounted is inserted with the substantial barrel part comprising in the present instance the barrel member 1 and sleeve member 8 into a through hole h made in the door D and having a bore diameter slightly larger than 12 mm. but much smaller than the outer diameter of the flange 13 of the cylinder member 11, from exterior side of the door D, while the cylinder member 11 is inserted into the hole h from interior side of the door D with the flange 13 disposed on the interior side and with the inner peripheral threads 12 screwed to the peripheral threads 9 on the sleeve member 8. Driving the cylinder member 11 further by means of the screwdriver tip or coin edge engaged in the grooves 14 onto the sleeve member 8, an end surface of the fixture member 5 and a side surface of the flange 13 of the cylinder member 11 mutually opposing are caused to approach one another through the thickness of the door D, respective said surfaces are urged to tightly abut both side surfaces of the door D and thus the optical system assembly and the cylinder member are fastened to each other holding the door therebetween.

Figure 3:
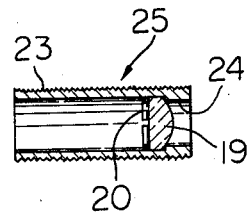
FIG. 3 is a sectioned view of a sleeve member employed in another embodiment of the present invention.

In FIG. 3 there is shown another embodiment of the sleeve member employed in the present invention, in which a sleeve member 25 is also provided over its outer periphery with male screw threads 23 and in the inner bore adjacent one end with a flange of slightly extending inward or a reduced bore part 24 providing a step facing inward, so that the eyepiece 19 will be butted on its convex surface side against the step of the flange or reduced bore part 24 and then fixed to the position by means of the C-shaped spring 20 fitted on the flat surface side of the eyepiece 19.

With the above described arrangement of the wide-angle spyglass according to the present invention, it is enabled to have the wide-angle outdoor view of 180° collimated within the narrow light path of the optical system of a limited diameter as to be, for example, 12 mm. at the outer periphery, since the large diameter wide-angle lens having a convex surface of a relatively large radius curvature and an opposing concave surface of a relatively small radius curvature providing an opening diameter substantially corresponding to the effective bore diameter of the barrel or sleeve part of desired dimension enclosing the light path is employed in combination with the objective having the concave substantially coinciding with the concave of the wide-angle lens. Consequently it is possible to obtain an optical spyglass providing a wider angled outdoor view and still compact in the dimension at its portion to be fitted to the door or the like.

Further according to the present invention, as the respective elements of the optical system are simply fitted in the respective fixture or mounting members which are assembled in turn together simply by screwing the one to the other, the assembling or disassembling work of the optical system is simple and easy without requiring any skilled art for precision mounting of the optical elements. Further, as no gluing is involved in the assembling of the optical elements, there is caused no trouble of thereby damaging optical performance of the products and thus the required performance of the products can be maintained uniformly in simple manner.

While the present invention has been described only with reference to the embodiments as illustrated in the drawings, the intention is not to limit the invention only to such embodiments but is to rather include all other modification, alterations and equivalent arrangements possible within the scope of appended claims.

Starting only for the purpose of examples, the barrel and sleeve members 1 and 8 shown as formed separately can be made to be an integral member presenting the assembled state as in FIG. 2, that is, in such a form that a stepped part for receiving thereon the objective 18 is provided so that the objective will be first fitted in the barrel member before the wide-angle lens and its fixture member are mounted to the barrel member and the inner peripheral threads thereof may be omitted. The light shielding plate may also be omitted if the side surface of the flange 2 of the barrel member 1 is subjected to a light reflection preventing measure.

What is claimed is:

1. A spyglass to be mounted in a door or the like for providing a wide-angle outdoor view comprising in combination:
   an optical system including:
   a wide-angle lens of a relatively large diameter and having on one side thereof a convex surface of a relatively large radius of curvature and on another side thereof an opposing concave surface of a smaller radius of curvature than said convex surface for converging incoming light of substantially 180° outdoor sight at a large rate,
   an objective of smaller diameter than said lens and having a concave surface on a side thereof abutting coaxially against said other side of said lens containing said first-named concave surface, for collimating said converged light into a relatively small confined diameter, and
   an eyepiece of smaller diameter than said lens and having a convex surface disposed coaxially with said objective and spaced therefrom for magnifying said collimated light to provide a normal view of said substantially 180° outdoor sight,
   means for securing said lens, objective, and eyepiece relative to one another, said securing means comprising:
   a substantially cylindrical portion of smaller diameter than said lens for closely enclosing said collimated light of confined diameter and including a first end securing said objective and a second end spaced axially from said first end for securing said eyepiece, and
   an enlarged portion at the first end for securing said large diameter lens,
   means for mounting said securing means including the optical system to the door or the like presenting said magnified view to the interior of the door or the like, said mounting means comprising:
   a cylindrical member of smaller diameter than said lens and including one end attached to said second end of said cylindrical portion, and another end having a flange for engaging the door or the like so that one side of the door or the like is gripped by said enlarged portion and the other side of the door or the like is gripped by said flange.

2. A spyglass according to claim 1, wherein said cylindrical portion comprises a elongated cylinder body, and said enlarged portion comprises a separate flange member mounted to said first end of said cylindrical body, said body extending outwardly from said flange member in the direction of said second end.

3. A spyglass according to claim 2, wherein said flange member is of a diameter substantially equal to that of the wide-angle lens and said enlarged portion further comprises a ring-shaped fixture member connected around said flange member for securing the lens therebetween.

4. A spyglass according to claim 1, wherein said cylindrical portion of said securing means comprises an elongated cylinder body having at said second end a stepped bore section for securing the eyepiece thereon, and said enlarged portion of said securing means comprises a short cylindrical body attached at one end to said first end of said elongated cylinder body and having a radially extending flange at its other end, said last-named flange having a diameter substantially equal to that of the wide-angle lens, said lens and objective being secured by means of a ring-shaped fixture member having an inwardly extended rim and mounted to the outer periphery of the last-named flange so that the objective is held between said first end of the elongated cylinder body and the concave surface of the lens which abuts against the last-named flange.

5. A spyglass according to claim 4, wherein said elongated cylinder body contains screw-threads on its outer periphery, said short cylindrical body contains screw-threads on its inner periphery so that the short cylindrical body is screwed onto the elongated cylinder body.

* * * * *